No. 623,949. Patented Apr. 25, 1899.
J. C. CROCKER.
BACK PEDALING BRAKE.
(Application filed Feb. 23, 1897.)
(No Model.)
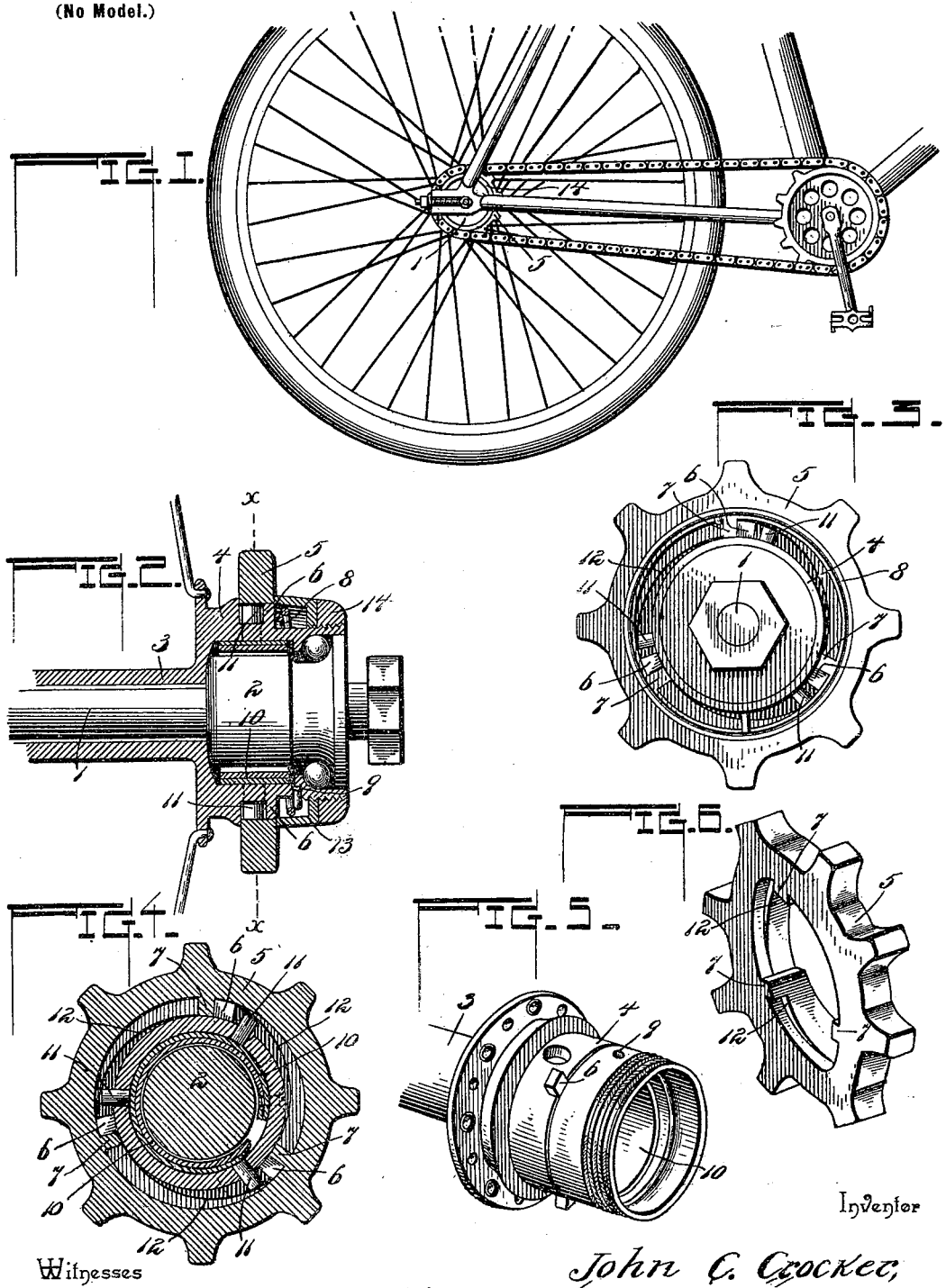
Witnesses
Milton O'Connell
U. B. Hillyard
Inventor
John C. Crocker,
By his Attorneys,
C. A. Snow & Co.

UNITED STATES PATENT OFFICE.

JOHN C. CROCKER, OF PARDOE, PENNSYLVANIA, ASSIGNOR OF TWO-THIRDS TO JOHN W. BELL, OF MERCER COUNTY, PENNSYLVANIA.

BACK-PEDALING BRAKE.

SPECIFICATION forming part of Letters Patent No. 623,949, dated April 25, 1899.

Application filed February 23, 1897. Serial No. 624,656. (No model.)

*To all whom it may concern:*

Be it known that I, JOHN C. CROCKER, a citizen of the United States, residing at Pardoe, in the county of Mercer and State of Pennsylvania, have invented a new and useful Bicycle-Brake, of which the following is a specification.

This invention relates to automatic brakes for bicycles and like machines propelled by foot-power.

One of the principal objects is to improve that class of brakes which are set by back pedaling or pressure applied upon the cranks in an inverse direction to that required for impelling the machine and to increase the effectiveness and conceal the brake mechanism without requiring a material enlargement of the hub or axle of the drive-wheel, which is an objectionable feature, as it detracts from the light appearance of the machine and adds materially to its weight.

The improvement is applied to the rear or drive wheel of the machine, and consists of an enlargement of the axle, a corresponding extension of the hub, a spring-brake located within the hub and normally held out of action, a series of pins slidably mounted in the hub and adapted to engage with the spring-brake, and a sprocket-wheel loosely mounted upon the hub and having a limited movement and provided with cam portions to engage with the pins for moving the latter inward and setting the brake upon turning the sprocket-wheel backward by back pedaling or the application of back pressure upon the cranks.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a fragmentary view of a bicycle in elevation, showing the application of the invention. Fig. 2 is a longitudinal section of an end portion of the drive-wheel hub, showing the relation of the parts constituting the improved brake. Fig. 3 is an end view of the hub and axle, the jam-nuts being removed. Fig. 4 is a transverse section about on the line X X of Fig. 2. Fig. 5 is a detail view in perspective of the end portion of the drive-wheel hub provided with the brake mechanism. Fig. 6 is a detail perspective view of the sprocket which is mounted upon the hub of the drive-wheel.

Corresponding and like parts are referred to in the following description and indicated in the several views of the drawings by the same reference characters.

The rear axle 1 is formed at one end with an enlargement 2, constituting a brake member, and which is grooved at its outer end, forming a ball-race. The hub 3 of the rear or drive wheel has an extension 4 at one end to receive the enlargement or brake member 2, and which has a ball-race at its outer end corresponding with the ball-race of the part 2 to receive the ball-bearings. The sprocket 5 is loosely mounted upon the hub extension 4 and has a limited rotary movement thereon to admit of a setting of the brake upon the application of back pressure to the pedals in the manner presently to be described. A series of lugs 6 are provided on the hub extension 4 and engage with corresponding lugs 7 of the sprocket, and these two sets of lugs constitute a clutch mechanism to effect engagement between the sprocket and hub when the two are revolving in the same direction. A spring 8 of the coil type is mounted upon the hub extension 4 and has one end bent to engage with an opening 9 formed therein and has its opposite end bent to engage with a lug 7, whereby the sprocket is maintained in a normal position and is returned to such position when moved therefrom by back pedaling upon removing the back pressure from the cranks, thereby insuring the sprocket being normally in clutched engagement with the drive-wheel.

A spring-brake 10 is located within the hub extension 4 and opposite the brake member 2 and consists of a spring-band lined with horn, leather, or like material to engage frictionally with the brake member 2 without causing unnecessary wear upon the parts. This spring-brake is normally held out of action and is applied only upon back pedaling. A series of pins 11 are slidably mounted in openings formed in the hub extension and are adapted to engage at their inner ends with the spring-brake and when moved inward compress the said brake and cause it to grip the brake member 2 with a force proportionate to the power or pressure applied to the cranks. The sprocket has a series of cam portions 12, which are adapted to engage with the outer ends of the pins 11, and these cam portions move the pins inward upon turning the sprocket backward, whereby the spring-brake 10 is compressed and caused to grip the part 2, whereby the speed of the machine is checked. Under normal conditions the sprocket is held in clutched engagement with the drive-wheel, and the spring-brake, being expanded, holds the pins 11 outward, but upon the application of back pressure to the cranks the sprocket is turned backward, and the cam portions 12, riding upon the pins 11, move them inward and cause an application of the brake in the manner set forth.

The outer end of the hub extension is exteriorly threaded and receives jam-nuts 13 and 14, the inner nut 13 having a collar which extends over and forms a housing for the spring 8 and conceals it and prevents the entrance of dust, wet, or other foreign matter into the operating parts associated with the brake mechanism.

For the sake of simplicity of description the part 11 is referred to as "pins;" but it is to be understood that any catch, dog, grip, detent, or movable part performing the same office and function is contemplated within the scope of the invention and is included within the sense of the term "pins."

Having thus described the invention, what is claimed as new is—

1. A brake for bicycles comprising a rotating wheel-hub, a cam fast therein, a rotating bushing concentric with said hub and capable of a limited rotary motion relative to said hub, a brake shoe or block rotating with said bushing and also movable radially to said hub, a fixed axle, and means for checking the rotary motion of said bushing relative to said hub, whereby said cam is caused to operate said brake shoe or block.

2. A brake for bicycles comprising a rotating wheel-hub, a cam fast therein, a rotating bushing concentric with said hub and capable of a limited rotary motion relative to said hub, a brake shoe or block rotating with said bushing and also movable radially relative to said hub, a fixed axle, and means for checking the rotary motion of said bushing relative to said hub, whereby said cam is caused to operate said brake shoe or block, and a retracting-spring normally tending to withdraw said brake shoe or block.

3. In an automatic brake for bicycles, &c., set by the application of back pressure upon the pedals, the combination of the axle supporting the drive-wheel provided with a brake member, the drive-wheel hub having an extension, a spring brake member located within the hub extension and encircling the brake member of the axle and normally held out of action by its inert expansive force, a sprocket loosely mounted upon the hub extension and normally having a clutched engagement therewith, and provided with cam portions, and movable pins supported by the hub extension and adapted to be pressed inward by the cam portions of the sprocket upon turning the latter backward, substantially as set forth for the purpose specified.

4. In an automatic brake for bicycles, &c., the combination of an axle, a hub mounted upon the axle, a spring-brake concealed within the hub or a portion thereof and encircling the brake member of the axle and normally held out of action by its inert expansive force, a sprocket or like part loosely mounted with respect to the hub and normally having a clutched engagement therewith, and provided with cam portions, and a series of pins adapted to engage at their inner ends with the aforesaid brake and adapted to be moved inward by the cam portions of the sprocket to set the brake, substantially as set forth for the purpose specified.

5. In an automatic brake for bicycles, &c., the combination of an axle provided with a brake member, a hub having an extension to receive the brake member of the axle, a spring-brake located within the hub extension, a series of pins mounted in openings in the hub extension, and a sprocket loosely mounted upon the hub extension and normally having a clutched engagement therewith, and formed with cam portions to engage with the aforesaid pins to move them inward and set the brake upon the application of back pressure to the pedals, substantially as set forth.

6. In an automatic brake for bicycles, &c., the combination of an axle having a brake member, a hub having a portion receiving the brake member of the axle, a spring-band located within the hub or portion thereof and lined with horn or like material, pins loosely mounted with respect to the hub and adapted to engage with the spring-band, and a sprocket loosely mounted upon the hub and normally having a clutched engagement therewith, and formed with cam portions to engage with the aforesaid pins to move them inward and set the brake, substantially in the manner described.

7. In an automatic bicycle-brake, the combination of an axle having an enlarged portion forming a brake member, a hub having an extension receiving the said brake member and provided with lugs, a spring-brake located in the said extension, pins loosely mounted in openings formed in the hub extension, a sprocket mounted upon the hub extension and having lugs to coöperate with the lugs thereof, and having cam portions to move the aforesaid pins inward, and a spring interposed between the sprocket and hub extension to normally hold the lugs of each in engagement, substantially as set forth.

8. An automatic brake constructed substantially as set forth, comprising an axle having an enlargement forming a brake member, a hub having an extension to receive the said brake member and having outwardly-extending lugs, a spring-brake located within the hub extension, pins loosely mounted in openings in the hub extension and having their inner ends engaging with the spring-brake, a sprocket loosely mounted upon the said hub extension and having inwardly-extending lugs and cam portions, the latter adapted to engage with and move the said pins inward, a spring interposed between the sprocket and hub extension and normally holding the lugs thereof in engagement, and a nut mounted upon the end of the hub extension and having a collar forming a housing for the said spring, substantially as set forth.

In testimony that I claim the foregoing as my own I have hereto affixed my signature in the presence of two witnesses.

JOHN C. CROCKER.

Witnesses:
GEO. E. HAMILTON,
FRANK P. RAY.